US006980364B2

(12) United States Patent
Herr et al.

(10) Patent No.: US 6,980,364 B2
(45) Date of Patent: Dec. 27, 2005

(54) PROJECTOR LENS

(75) Inventors: Guenter Herr, Ehringshausen (DE); Arnd Menschig, Weil im Schoenbuch (DE); Andreas Rose, San Jose, CA (US); Hans Theis, Mittenaar (DE); Artur Wojt, Seeheim-Jugenheim (DE)

(73) Assignee: Euromicron Werkzeuge GmbH, Mittenaar (DE)

(*) Notice: Subject to any disclaimer, the term of this patent is extended or adjusted under 35 U.S.C. 154(b) by 0 days.

(21) Appl. No.: 10/600,153

(22) Filed: Jun. 19, 2003

(65) Prior Publication Data

US 2004/0057028 A1 Mar. 25, 2004

Related U.S. Application Data

(63) Continuation of application No. PCT/EP01/15043, filed on Dec. 19, 2001.

(30) Foreign Application Priority Data

Dec. 20, 2000 (DE) ................................ 100 65 197

(51) Int. Cl.[7] ............................ G02B 7/00; G02B 6/32
(52) U.S. Cl. ......................................... 359/642; 385/33
(58) Field of Search ........................ 359/642, 649–651, 359/710, 796; 385/33

(56) References Cited

U.S. PATENT DOCUMENTS

| | | | | |
|---|---|---|---|---|
| 3,649,098 | A * | 3/1972 | Suverison | 385/33 |
| 4,290,667 | A | 9/1981 | Chown | 385/33 |
| 4,510,005 | A | 4/1985 | Nijman | 156/221 |
| 4,729,621 | A * | 3/1988 | Edelman | 385/33 |
| 5,293,438 | A * | 3/1994 | Konno et al. | 385/35 |
| 5,346,583 | A | 9/1994 | Basavanhally | 216/26 |
| 5,446,816 | A | 8/1995 | Shiraishi et al. | 385/33 |
| 5,505,725 | A * | 4/1996 | Samson | 606/7 |
| 5,815,624 | A | 9/1998 | Rosenberg | 385/115 |
| 6,072,148 | A | 6/2000 | Azdasht | 219/121.63 |
| 6,115,521 | A | 9/2000 | Tran et al. | 385/52 |
| 6,453,090 | B1 * | 9/2002 | Conde et al. | 385/33 |

FOREIGN PATENT DOCUMENTS

| | | |
|---|---|---|
| DE | 76 37 803 | 8/1977 |
| DE | 31 41 904 | 6/1983 |
| DE | 37 33 987 | 4/1989 |
| DE | 38 31 322 | 3/1990 |
| DE | 42 38 188 | 5/1994 |
| DE | 199 19 428 | 11/2000 |

(Continued)

OTHER PUBLICATIONS

*Patent Abstracts of Japan*, Publication No. 59062812, “Optical Fiber Connector Core”, Apr. 10, 1984.

*Primary Examiner*—Georgia Epps
*Assistant Examiner*—William Choi
(74) *Attorney, Agent, or Firm*—Lipsitz & McAllister LLC

(57) ABSTRACT

The aim of the invention is to improve a projector lens, comprising an optical element for shaping radiation fields emitted from light guides, such that the light guide may be optimally coupled to the optical element. Said aim is achieved, whereby the optical element is embodied in a monolithic body, comprising a radiation field forming region and a connector region for the light guide, which form part of the optical element and the connector region comprises a connector surface for a front face of the light guide which approximately matches a diameter of the light guide and is arranged offset from a vicinity of the connector region.

27 Claims, 6 Drawing Sheets

FOREIGN PATENT DOCUMENTS

| | | |
|---|---|---|
| EP | 0 430 532 | 6/1991 |
| EP | 0 642 042 | 3/1995 |
| EP | 0 905 534 | 3/1999 |
| GB | 1 570 001 | 6/1980 |
| GB | 2 286 899 | 8/1995 |
| WO | 00/03873 | 1/2000 |

* cited by examiner

FIG.11
FIG.10
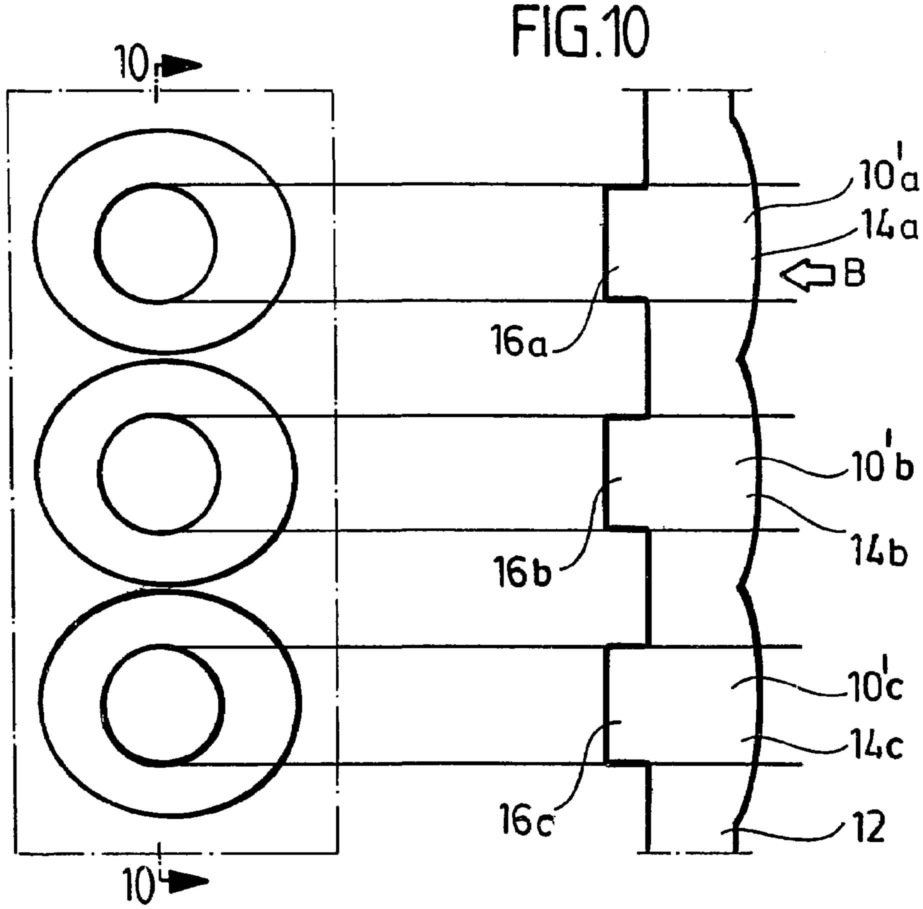
FIG.12
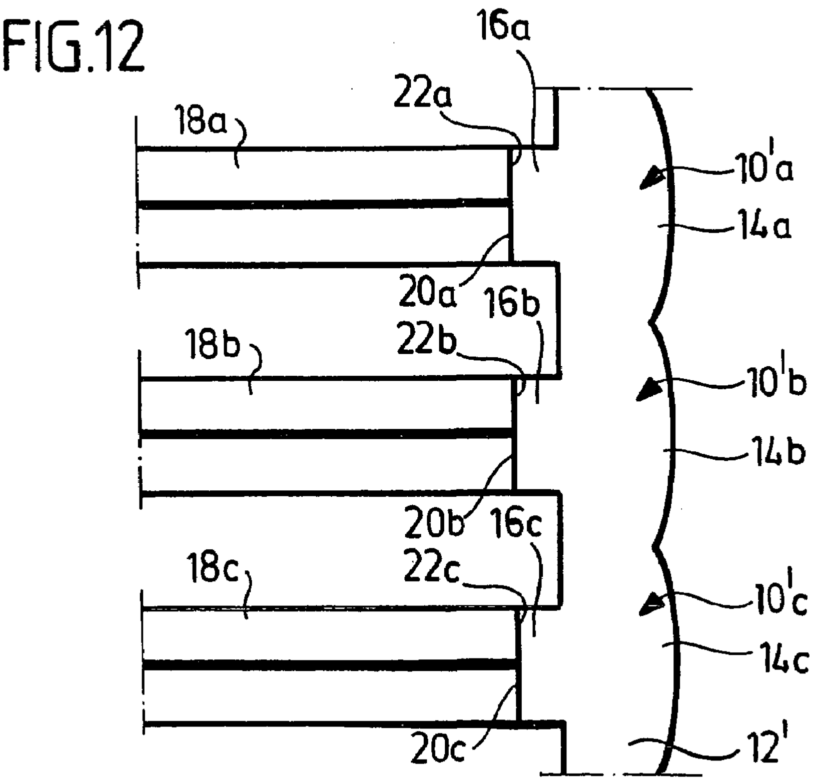

PROJECTOR LENS

The present disclosure relates to the subject matter disclosed in PCT application No. PCT/EP01/15043 of Dec. 19, 2001, which is incorporated herein by reference in its entirety and for all purposes.

BACKGROUND OF THE INVENTION

The invention relates to a projector lens comprising an optical element for shaping radiation fields emitted from light guides.

Projector lenses of this type are known from the prior art, but these always have the problem of coupling the light guide optimally onto the optical element.

SUMMARY OF THE INVENTION

This problem is solved in the case of a projector lens of the type described at the beginning according to the invention by the optical element being formed in a monolithic body which has a radiation-field-shaping region and a connecting region for the light guide which are part of the optical element, and by the connecting region having a connecting area for a front face of the light guide which is adapted approximately to a diameter of the light guide and is disposed offset from a vicinity of the connecting region.

The advantage of this solution is to be seen in that, provision of the monolithic body makes the optical element particularly easy to produce and, in spite of this easily producible optical element, the light guide can also be fixed in the desired exact position in relation to the optical element in an easy way.

With regard to the formation of the connecting region carrying the connecting area, a wide variety of possibilities are conceivable. For instance, one advantageous solution provides that the connecting region forms a projection which goes beyond the vicinity of the connecting region and to which the light guide can be easily fixed in a centered manner, in particular if, according to the invention, the projection has a diameter corresponding approximately to the diameter of the light guide.

As an alternative to this, it is conceivable for the connecting region to be formed as a depression with respect to the vicinity of the connecting region, so that centering, and consequently exact positioning, of the light guide in relation to the optical element is possible by introducing the end of the respective light guide that carries the front face into a depression of this type.

With regard to the formation of the optical element, a wide variety of possibilities are conceivable.

A preferred solution provides that the optical element is part of a monolithic body extending beyond said element, the monolithic body itself having further regions, such as for example a carrier region.

In this case, the vicinity of the connecting region is formed by one side of the monolithic body, for example the carrier region, in particular a rear side of the same.

As an alternative to this, it is also conceivable however for the monolithic body to be held in a carrier which is not part of the monolithic body, since the production of the monolithic body is simplified in this way.

In such a case, the vicinity of the connecting region is preferably formed by one side of the carrier, preferably a rear side of the carrier.

One particularly advantageous variant of the solution according to the invention provides that the optical element is formed by a monolithic body which is approximately cylindrically constructed and encloses both the radiation-shaping region and the connecting region, and is for its part held in a carrier.

In this case, the cylindrical body itself forms the connecting area, which is then for its part offset from the vicinity, that is to say from a rear side of the carrier.

Such offsetting of the connecting area may take place either by the monolithic body extending beyond the rear side, in a way similar to a projection, or being set back from the rear side, and consequently a depression which extends up to the connecting area being formed from the rear side.

With regard to the formation of the radiation-field-shaping region, no further details have been specified in connection with the exemplary embodiments so far described.

It is for instance preferably provided that the radiation-field-shaping region has an area curved in the manner of a lens for radiation field shaping.

Another preferred solution provides that the radiation-field-shaping region has a refractive index gradient for radiation field shaping.

The radiation-field-shaping region is preferably formed by a cylindrical monolithic body with a GRIN optic.

Furthermore, no further details have been specified in connection with the exemplary embodiments so far concerning the way in which the optical elements are disposed.

One advantageous solution for instance provides that the optical elements are individual optical elements.

These individual optical elements are preferably held by a common carrier.

However, a particularly advantageous solution provides that the optical elements are formed by segmental regions of a unitary monolithic body.

The manner of radiation field shaping has not been defined in any more detail in connection with the exemplary embodiments described so far.

For instance, in principle all types of beam shaping such as focusing, defocusing, etc. are conceivable.

It is particularly advantageous if the radiation-field-shaping region has boundary surfaces shaped in such a way that rays reflected on them are substantially not reflected back directly into the light guide, and consequently the projector lens operates without backreflection with respect to the light guide.

It is particularly advantageous in the case of a collimating radiation-field-shaping region if exact collimation does not takes place, since consequently there is substantially no reflection at the boundary surfaces of the radiation coming from the light guide back into the light guide.

The connection between the light guide and the connecting area of the connecting region may take place in a wide variety of ways.

A substantially reflection-free connection is particularly advantageous.

A connection of this type can be advantageously realized by adhesive bonding or welding by melting.

One possible way of achieving melting is for a heatable material by means of which the material in the region of the areas to be connected can be heated up to be provided in the region of the areas to be connected.

The heatable material may in this case have been applied in the form of a layer.

One particularly advantageous solution provides in this case that a collar of a heatable material by means of which the material in the region of the areas to be connected can be heated up is provided in the region of the areas to be connected. A collar has the great advantage that it can run around the region of the areas to be connected and consequently ensures optimum heating.

Another advantageous solution provides that the light guide is provided with a collar of heatable material in the region of its front face. Providing the light guide with a collar of this type can be realized in a particularly advantageous way.

The heatable material can in this case be heated up, for example, by an electric current or by an electrical discharge.

It is even more advantageous if the heatable material can be heated up by absorption of rays.

Such an absorbed beam may, for example, also be a particle beam or an electron beam. One advantageous variant provides that the absorption of a beam takes place by absorption of electromagnetic radiation.

It is particularly advantageous in this case if the electromagnetic radiation lies in the wavelength range of light.

One particularly advantageous solution provides that the material can be heated up by laser radiation.

Laser radiation may impinge on the material from the outside.

It is also conceivable, however, to pass the laser radiation through the light guide.

One particularly advantageous solution provides that the laser radiation passes through the monolithic body in order to heat up the heatable material.

One possibility for the provision of the radiation-absorbing layer is to provide this layer on the front faces to be connected.

It is particularly suitable when producing a welded connection to provide a collar which can be heated up by radiation in the region of the connection to be established.

Further features and advantages of the invention are the subject of the description which follows and of the graphic representation of some exemplary embodiments.

BRIEF DESCRIPTION OF THE DRAWINGS

FIG. 10 shows a section along the line 10—10 in FIG. 11 through a fourth exemplary embodiment of a projector lens according to the invention;

FIG. 11 shows a plan view in the direction of the arrow B in FIG. 10;

FIG. 12 shows a representation similar to FIG. 1 through the fourth exemplary embodiment;

DETAILED DESCRIPTION OF THE INVENTION

Figure 1:
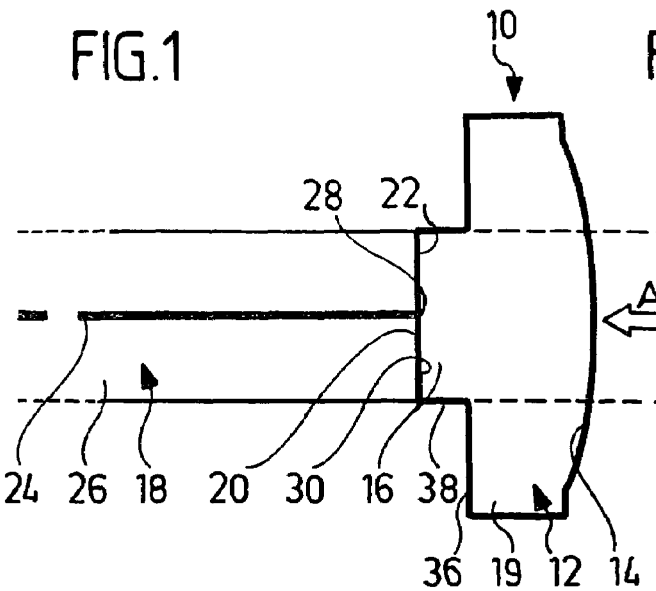
FIG. 1 shows a longitudinal section through a first exemplary embodiment of a projector lens according to the invention.
Figure 2:
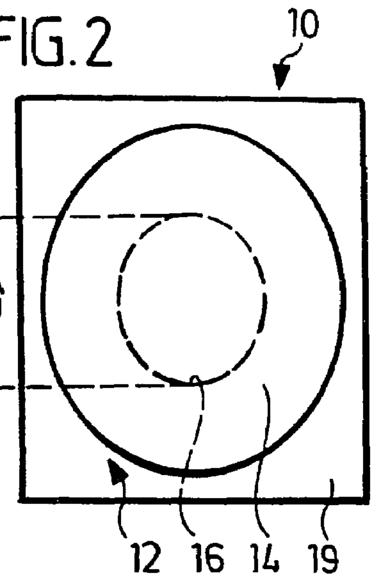
FIG. 2 shows a plan view of the first exemplary embodiment in the direction of the arrow A in FIG. 1.
Figure 3:
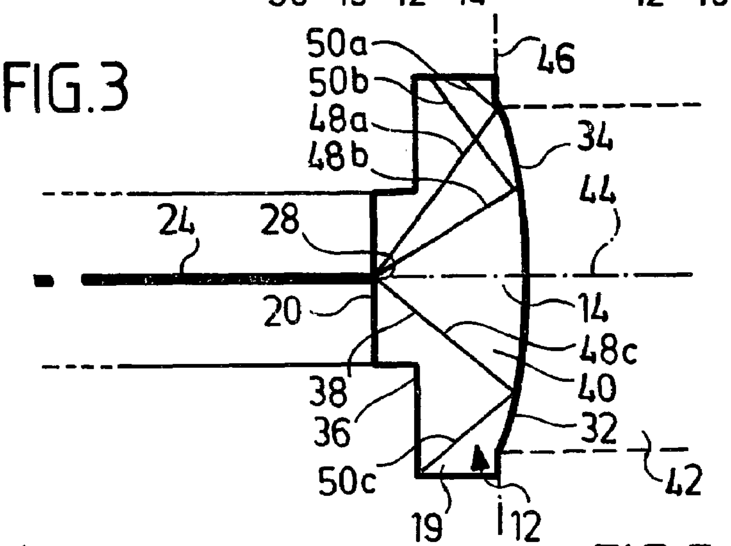
FIG. 3 shows a section similar to FIG. 1 with a representation of reflections at a boundary surface and an optical element of the projector lens according to the invention.

A first exemplary embodiment of a projector lens according to the invention comprises an optical element, designated as a whole by 10, which, as represented in FIGS. 1 to 3, formed in a monolithic body 12, which has a radiation-field-shaping region 14 and a connecting region 16 for a light guide, designated as a whole by 18, and also a carrier region 19 lying outside these regions.

The connecting region 16 is in this case provided with a connecting area 20, which is adapted with regard to its cross-sectional area to a cross-sectional area of a front face 22 of the light guide 18, the light guide 18 preferably having a core 24 and a cladding 26 and the front face 22 having a front face 28 of the core 24 and, enclosing the latter, a front face 30 of the cladding 26.

The light guide 18 is preferably adhesively bonded or welded by its front face 22 to the connecting area 20, in order to obtain a substantially reflection-free optical contact between the front face 28 of the core 24 and the connecting area 20.

Furthermore, as represented in FIG. 3, the radiation-field-shaping region 14 of the monolithic body 12 is formed as a collimating element, which forms from a divergent radiation field 40 emanating from the front face 28 in the optical element 10 a substantially collimated radiation field 42, which is emitted from the radiation-field-shaping region 14 on a front side 32 lying opposite the connecting area 20.

In this case, to achieve the collimating effect, the front side 32 is preferably provided with a curved region 34 with respect to a plane 46 that is perpendicular to a beam axis 44, it being possible, for example, to fix the collimating effect of the radiation-field-shaping region 14 by the curvature.

The curved region 34 forms a boundary surface between the material of the monolithic body 12 and the surrounding medium, so that undesired reflections of rays 48 emanating in the monolithic body 12 can occur at this region.

The curved region 34 is in this case preferably formed in such a way that the rays 48 emanating within the monolithic body 12 in the direction of the curved region 34 are reflected in such a way that the reflected rays 50 emanate in such a way that they can no longer enter the core 24 through the front face 28, so that in the monolithic body 12 a back reflection of the radiation field 40 into the core 24 are substantially avoided in the region of the front side 32.

In addition, it is also advantageous to provide an anti-reflection coating, which reduces the reflection.

In the case of the first exemplary embodiment, the connecting region 16 is preferably formed in such a way that the connecting area 20 is disposed at a spacing from a rear side 36 of the carrier region 19 of the monolithic body 12 in such a way that an approximately cylindrical free projection 38 is formed extending from the rear side 36 and for its part carries the connecting area 20.

A connecting area 20 which is raised in such a way from the rear side 36 and the cross-sectional area of which corresponds substantially to the diameter of the light guide 18 has the advantage that, during fixing, in particular the melting of the front face 22 of the light guide 18 onto the raised and free connecting area 20, a self-centering effect is obtained if the diameter of the connecting area 20 corresponds substantially to the diameter of the front face 22, and consequently sufficiently precise positioning of the light guide 18 with respect to the optical element 10 can be achieved in an easy way.

Figure 4:
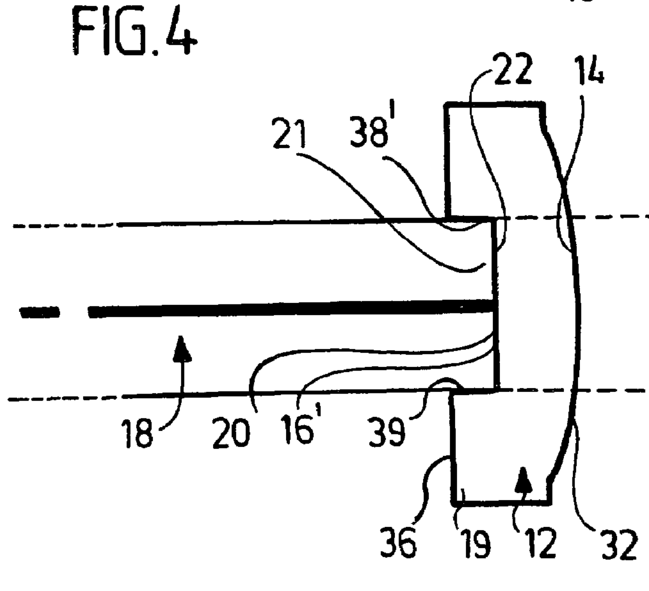
FIG. 4 shows a representation similar to FIG. 1 of a second exemplary embodiment of a projector lens according to the invention.
Figure 5:
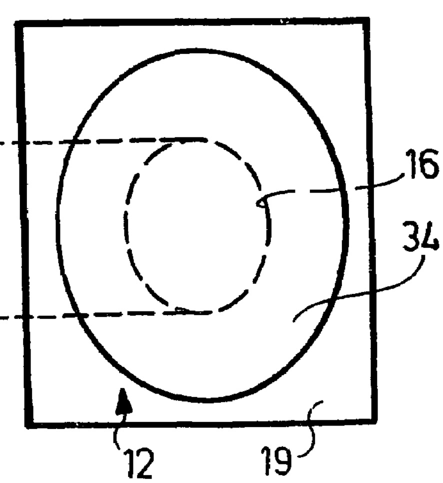
FIG. 5 shows a representation similar to FIG. 2 of the second exemplary embodiment.
Figure 6:
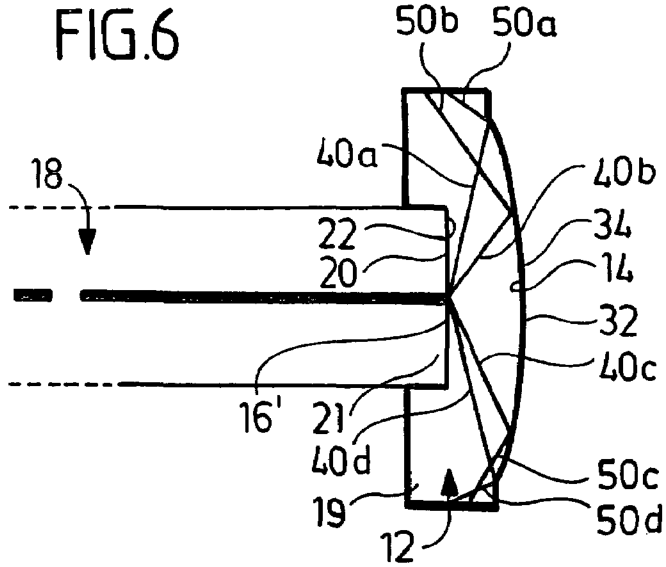
FIG. 6 shows a representation similar to FIG. 3 of the second exemplary embodiment.

In the case of a second exemplary embodiment of a projector lens, represented in FIGS. 4 to 6, by contrast with the first exemplary embodiment, the connecting region 16' is formed in such a way that the connecting area 20 is offset with respect to the rear side 36 in the direction of the front side 32 and consequently forms a depression 38' from the rear side 36, into which the light guide 18 can be introduced with its front region 21, carrying the front face 22, in order to apply the front face 22 to the connecting area 20 and connect it to the latter, for example by adhesive bonding or welding or a similar method.

Furthermore, peripheral walls 39 of the depression 38' effect a centering of the front region 21 of the light guide 18 for the connection of the front face 22 of the latter to the connecting area 20.

Otherwise, the second exemplary embodiment is formed in the same way as the first exemplary embodiment, so that reference can be made to the full content of the statements made with respect to said first embodiment.

Figure 7:
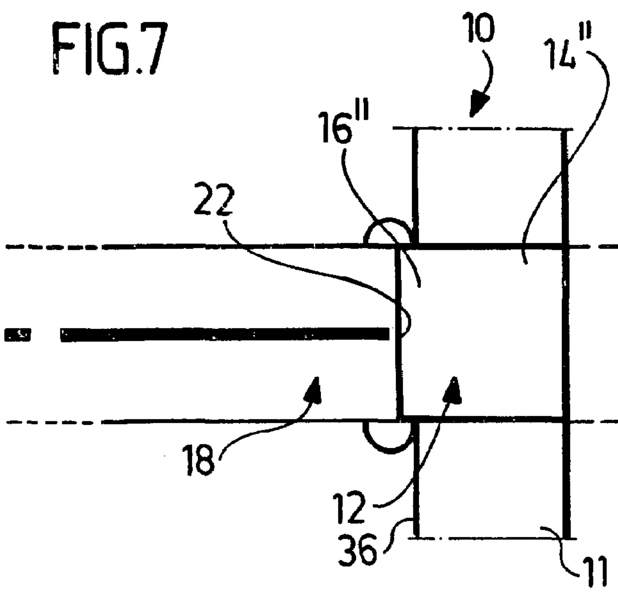
FIG. 7 shows a representation similar to FIG. 1 of a third exemplary embodiment of a projector lens according to the invention.
Figure 8:
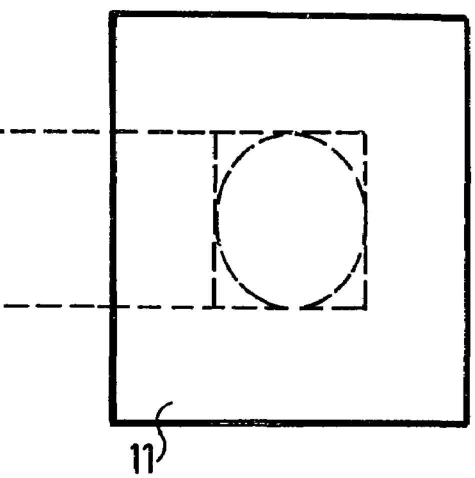
FIG. 8 shows a representation similar to FIG. 2 of the third exemplary embodiment.
Figure 9:
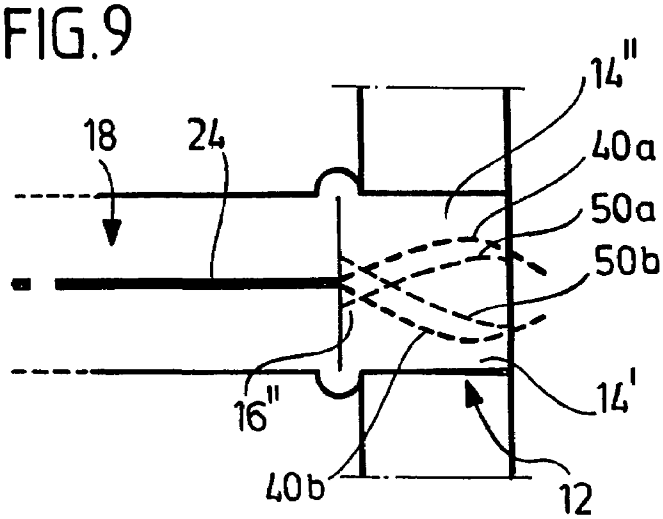
FIG. 9 shows a representation similar to FIG. 3 of the third exemplary embodiment.

In the case of a third exemplary embodiment of a projector lens according to the invention, represented in FIGS. 7 to 9, the optical element 10 is held by a carrier 11, fitted into which is the monolithic body 12, which has the radiation-field-shaping region 14" and the connecting region 16", which both have approximately the same diameter and are realized by the monolithic body 12 of the same diameter.

In this case, the monolithic body 12 is disposed in the carrier 11 in such a way that the connecting region 16" protrudes from a rear side 36 of the carrier 11 and consequently, in a way similar to the first exemplary embodiment, forms a free cylindrical projection 38, to which the light guide 18 can be fixed with its front face 22 by welding.

It is also the case in the third exemplary embodiment that the radiation-field-shaping region 14" of the monolithic body 12 is formed in such a way that it acts substantially in a collimating manner, the radiation-field-shaping region 14" being formed by a GRIN optic, which, on account of a refractive index varying in the radial and/or axial directions, acts in a collimating manner. Such GRIN optics, also known as graded-index rod optics, are commercially available as GRIN lenses or GRIN fibers.

In the case of a fourth exemplary embodiment of a projector lens, represented in FIGS. 10 to 12, those elements which are identical to the previous exemplary embodiments are provided with the same reference numerals, so that reference can be made to the full content of the statements made with respect to these exemplary embodiments.

In particular, the fourth exemplary embodiment is based on the concept of the first exemplary embodiment, though not just a single optical element 10 is provided in the monolithic body 12 but a multiplicity of optical elements 10' are formed in a unitary monolithic body 12', the monolithic body 12' having for each individual one of the optical elements 10'*a* to 10'*c* a dedicated radiation-field-shaping region 14*a–c* and a dedicated connecting region 16, and the connecting region 16*a–c* and the radiation-field-shaping region 14*a–c* being formed in the same way as in the case of the first exemplary embodiment.

Furthermore, the fixing of the light guides 18 also takes place in the same way as in the case of the first exemplary embodiment on the respectively dedicated connecting areas 20 of the connecting regions 16.

The advantage of this solution can be seen in particular in that the self-centering of the end of the light guide 18 carrying the respective front face 22 in relation to the connecting region 16 is of considerable significance in this solution, since it allows a large number of light guides 18 to be connected to a large number of connecting regions 16 in an easy way, without inadequate results being obtained on account of inadequate centering of the front face 22 in relation to the connecting areas 20.

In the case of the fourth exemplary embodiment of the projection lens, the connection between the light guides 18 and the individual connecting areas 20 preferably takes place by means of welding, with melting of the material of the front face and/or of the light guide 18 preferably being required in the region 21 of the light guide 18 near the front face 22.

Figure 13:
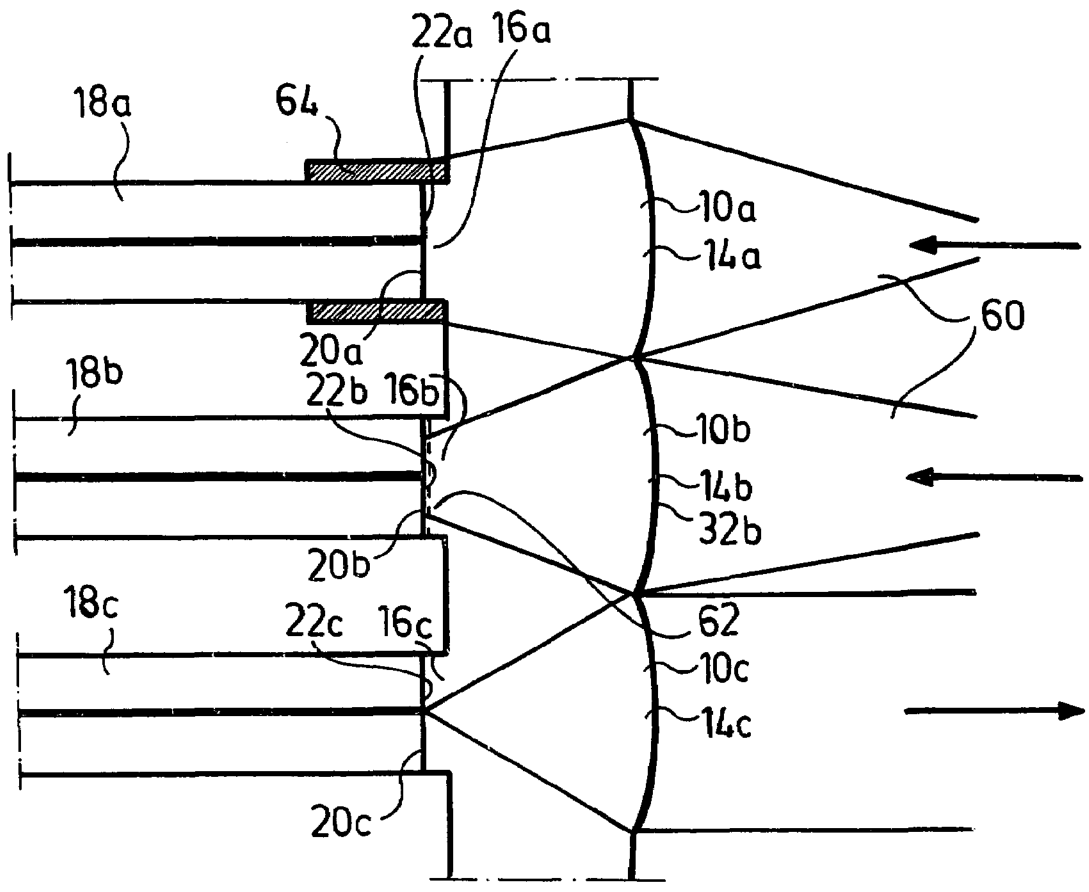
FIG. 13 shows a representation similar to FIG. 12 with a representation of laser welds for the connection of the light guide and optical element.

Such melting of the light guide 18 takes place as represented in FIG. 13 on the basis of the optical element 10*b* by a divergent laser beam 60 being coupled in via the front side 32*b* of the optical element 10*b* and focused onto the front face 22 of the light guide 18 and the front face 22*b* consequently being heated up by the laser radiation being absorbed by a layer 62, for example of $SiO_2$, applied to the front face 22*b*, in order to melt the material in this region.

However, as an alternative or in addition to this, it is conceivable, as likewise represented in FIG. 13 on the basis of the optical element 10*a*, to couple the diverging light beam 60 into the radiation-field-shaping region 14*a* in such a way that it not only impinges on the front face 22*a* of the light guide 18*a* but also impinges on a collar 64 which encloses the connecting region 16*a* and the end of the light guide 18*a*, carrying the front face 22*a*, and is formed in such a way that it absorbs the laser beam 60 and consequently serves the purpose of heating the end of the light guide 18*a*, carrying the front face 22*a*, by thermal coupling in the region of the front face 22*a* and the connecting area 20*a*, and consequently of contributing to the advantageous welding of the front face 22*a* to the connecting area 20*a*, so that welding with laser radiation 60 coupled in through the optical element 10 is possible even with low absorption of the laser beam 60 in the light guide 18.

Figure 15:
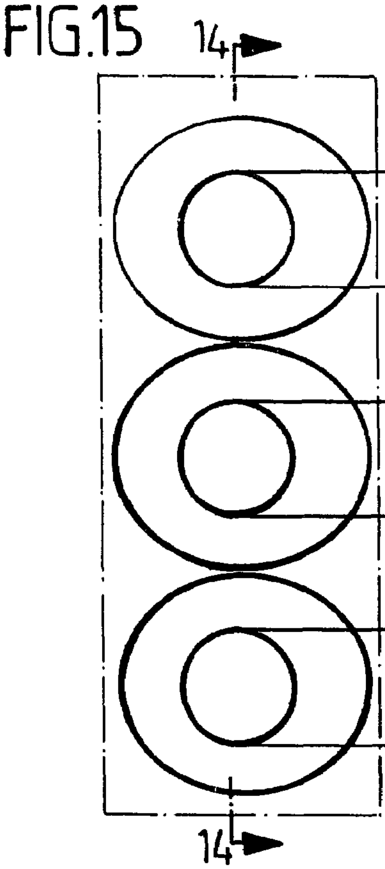
FIG. 15 shows a plan view in the direction of the arrow C in FIG. 14.
Figure 14:
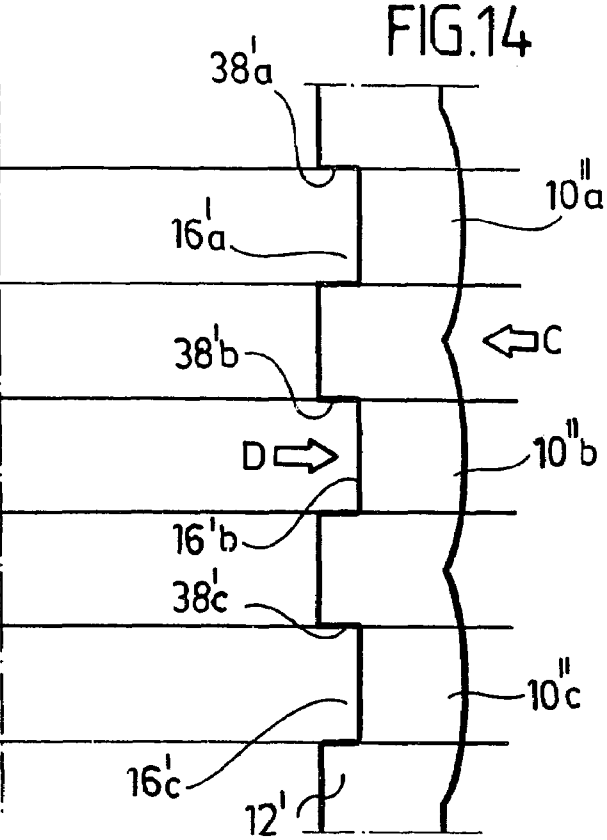
FIG. 14 shows a section along line 14—14 in FIG. 15 through a fifth exemplary embodiment of a projector lens according to the invention.
Figure 16:
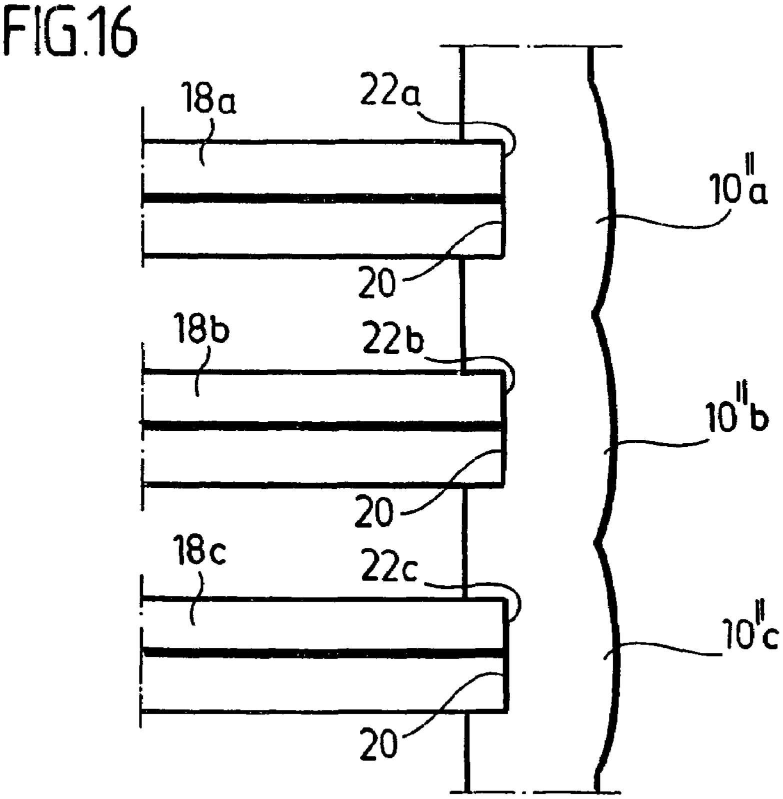
FIG. 16 shows a representation similar to FIG. 1 of the fifth exemplary embodiment and FIG. 17 shows a representation of a variant of the fifth exemplary embodiment in the form of a plan view in the direction of the arrow D in FIG. 14.

In the case of a fifth exemplary embodiment, represented in FIGS. 14 to 16, those elements which are identical to those of the previous exemplary embodiments are provided with the same reference numerals, so that reference can be made to the full content of the statements made with respect to the previous exemplary embodiments with regard to the description of these elements.

The fifth exemplary embodiment of a projector lens is based in principle on the second exemplary embodiment, with the individual optical elements 10" being combined into a single monolithic body 12' and the connecting regions 16' forming depressions 38' in a way corresponding to the second exemplary embodiment, into which the light guides 18 can be introduced with their front regions 21 bordering the front face 22, can be positioned and can be placed against the connecting area 20.

Figure 17:
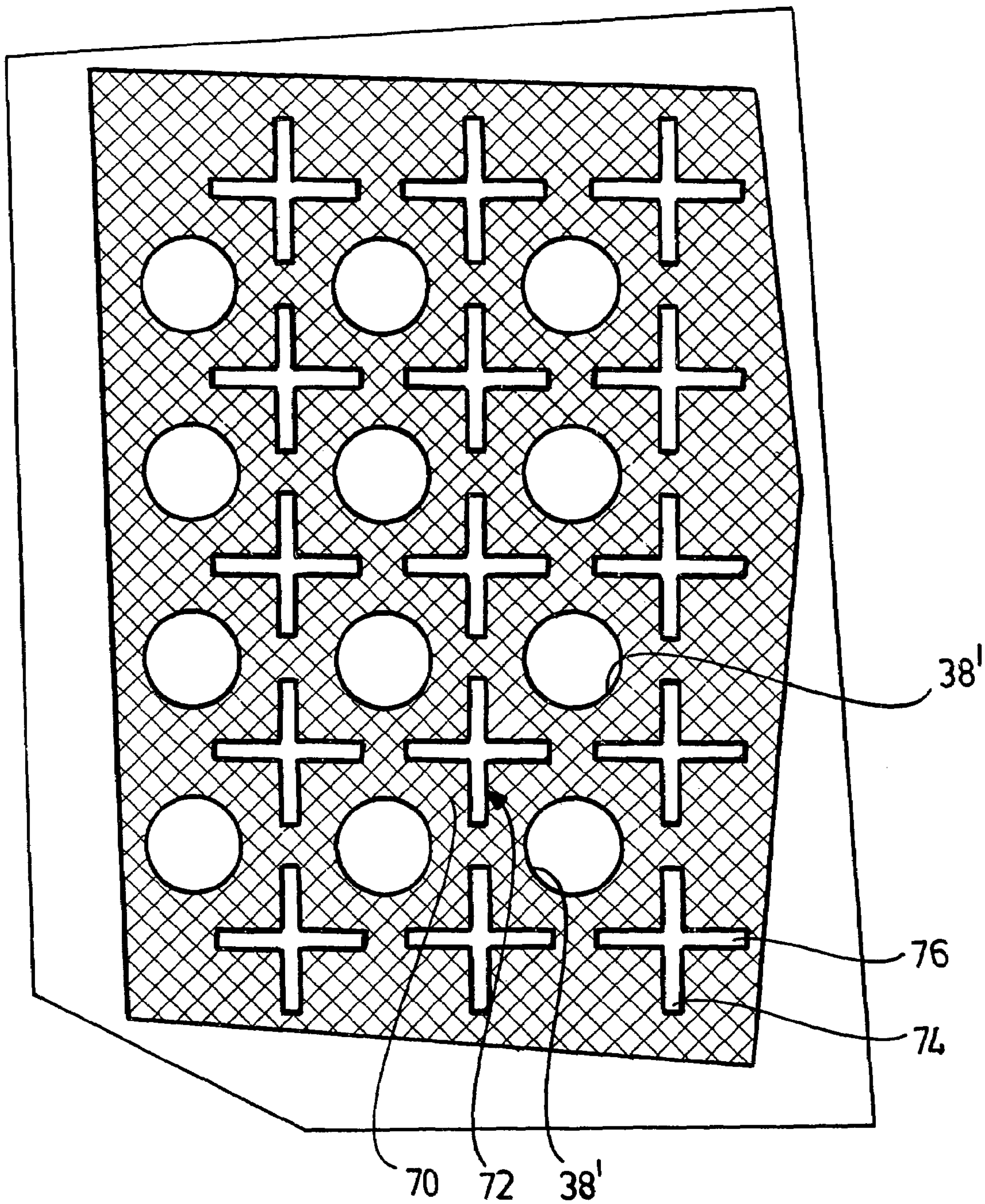

In the case of one variant of the fifth exemplary embodiment, represented in FIG. 17, provided in addition to the depressions 38', to be precise to the side of them, preferably in a region 70 respectively lying between four depressions 38', are markings 72, which serve for example as a positioning aid for an introducing device, in order when introducing the light guides 18 with their front face 22*a* into the depressions 38', to align the light guides 18 exactly in relation to the depressions 38' and consequently allow them to be introduced precisely into the latter.

The markings 72 are preferably formed by two marking segments 74 and 76, running in directions perpendicular to each other, so that a point in the respective area region 70 can be uniquely defined by each marking 72.

The markings 72 are preferably disposed in such a way that at least two such markings 72 are associated with each of the depressions 38'.

The markings 72 described in connection with the fifth exemplary embodiment may, however, also be provided in the same way for positioning the light guides 18 in the case of the fourth exemplary embodiment according to FIGS. 10 to 13 in intermediate regions between the connecting regions 16 or, in the case of monolithic micro-optics, without additional structuring of the connecting region.

What is claimed is:

1. Optical projection system comprising:

an optical element for shaping radiation fields emitted from a light guide, the optical element being formed in a monolithic body having a radiation-field-shaping region and a connecting region for the light guide, the connecting region having a connecting area for accepting a front face of the light guide, said connecting area being adapted approximately to a diameter of the light guide, and a carrier extending outside said radiation-field-shaping region and adjacent said connecting region, said connecting region extending beyond a side of the carrier to form a free standing projection having the connecting area on an end face of said projection, wherein the monolithic body is held by the carrier, which is separate from the monolithic body.

2. A system according to claim 1, wherein the optical element is formed by a monolithic body which is approximately cylindrically constructed and encloses both the radiation-field-shaping region and the connecting region.

3. A system according to claim 1, wherein the radiation-field-shaping region has an area curved in the manner of a lens for radiation field shaping.

4. A system according to claim 1, wherein the radiation-field-shaping region has boundary surfaces shaped in such a way that rays reflected on them are substantially not reflected back directly into the light guide.

5. A system according to claim 4, wherein the radiation-field-shaping region acts in such a way that it does not collimate exactly.

6. A system according to claim 1, wherein the light guide is connected to the connecting area of the connecting region such that it is substantially reflection-free.

7. A system according to claim 1, wherein a heatable material is provided by means of which material in a region of the areas of the light guide and the connecting area which are to be connected can be heated up to effect a connection of the light guide and the connecting area.

8. A system according to claim 7, wherein a collar of a heatable material by means of which the material in the region of the areas to be connected can be heated up is provided in the region of the areas to be connected.

9. A system according to claim 7, wherein the light guide is provided with a collar of heatable material in the region of its front face.

10. A system according to claim 7, wherein the heatable material can be heated up by absorption of rays.

11. A system according to claim 10, wherein the material can be heated up by laser radiation.

12. A system according to claim 11, wherein the material can be heated up by laser radiation passing through the monolithic body.

13. Optical projection system comprising:

an optical element for shaping radiation fields emitted from a light guide, the optical element being formed in a monolithic body having a radiation-field-shaping region and a connecting region for the light guide, the connecting region having a connecting area for accepting a front face of the light guide, said connecting area being adapted approximately to a diameter of the light guide, and a carrier extending outside said radiation-field-shaping region and adjacent said connecting region, said connecting region extending beyond a side of the carrier to form a free standing projection having the connecting area on an end face of said projection, wherein the radiation-field-shaping region has a refractive index gradient for radiation field shaping.

14. Optical projection system comprising:

a plurality of individual optical elements for shaping radiation fields emitted from corresponding light guides, the optical elements being formed in a monolithic body, each optical element having a corresponding radiation-field-shaping region and a corresponding connecting region for the corresponding light guide, each connecting region having a connecting area for accepting a front face of the corresponding light guide, each connecting area being adapted approximately to a diameter of the corresponding light guide, and a carrier extending outside said radiation-field-shaping regions and adjacent said connecting regions, said connecting regions extending beyond a side of the carrier to form free standing projections having the connecting areas on end faces of said projections.

15. A system according to claim 14, wherein the individual optical elements are held by a common carrier.

16. A system according to claim 14, wherein the individual optical elements are formed by segmental regions of the monolithic body.

17. A system according to claim 14, wherein a marking is associated with each connecting region.

18. A system according to claim 14, wherein the radiation-field-shaping regions each have an area curved in the manner of a lens for radiation field shaping.

19. A system according to claim 14, wherein the radiation-field-shaping regions each have boundary surfaces shaped in such a way that rays reflected on them are substantially not reflected back directly into the light guide.

20. A system according to claim 19, wherein the radiation-field-shaping regions act in such a way that they do not collimate exactly.

21. A system according to claim 14, wherein each light guide is connected to the corresponding connecting area of the connecting region such that it is substantially reflection-free.

22. A system according to claim 14, wherein a heatable material is provided by means of which material in a region of the areas of each light guide and the corresponding connecting area which are to be connected can be heated up to effect a connection of each light guide and the corresponding connecting area.

23. A system according to claim 22, wherein a collar of a heatable material by means of which the material in the region of the areas to be connected can be heated up is provided in the region of the areas to be connected.

24. A system according to claim 22, wherein each light guide is provided with a collar of heatable material in the region of its front face.

25. A system according to claim 22, wherein the heatable material can be heated up by absorption of rays.

26. A system according to claim 25, wherein the material can be heated up by laser radiation.

27. A system according to claim 26, wherein the material can be heated up by laser radiation passing through the monolithic body.

* * * * *